United States Patent [19]

Summers

[11] 4,019,280
[45] Apr. 26, 1977

[54] COLLAPSIBLE PLANT SUPPORT
[75] Inventor: James B. Summers, Lima, Ohio
[73] Assignee: NBS Incorporated, Huntsville, Ohio
[22] Filed: Oct. 6, 1975
[21] Appl. No.: 619,577
[52] U.S. Cl. .................................... 47/45; 47/42; 135/4 C; 206/303; 206/493; 211/181; 224/45 W; 248/175
[51] Int. Cl.² ........................................ A01G 17/04
[58] Field of Search ............................. 47/42–47; 248/175, 188.91, 167, 168, 435, 156; 211/181, 203; 135/1 C, 4 C; 267/166, 182; 206/303, 493; 224/45 W, 42

[56] References Cited

UNITED STATES PATENTS

| 551,000 | 12/1895 | Parker | 47/47 |
|---|---|---|---|
| 915,146 | 3/1909 | Woerner | 47/47 |
| 1,554,714 | 9/1925 | Cook | 47/28 |
| 1,683,043 | 9/1928 | Miller | 47/28 |
| 1,759,645 | 5/1930 | Janke et al. | 248/167 X |
| 1,792,968 | 2/1931 | Danforth | 248/167 X |
| 1,794,076 | 2/1931 | Jablons | 248/175 X |
| 2,014,175 | 9/1935 | Hart | 47/28 |
| 2,051,596 | 8/1936 | Harbaugh | 47/28 |
| 2,308,713 | 1/1943 | Price | 206/493 |

FOREIGN PATENTS OR APPLICATIONS

| 69,623 | 4/1941 | Czechoslovakia | 47/43 |
|---|---|---|---|
| 804,499 | 7/1949 | Germany | 47/47 |
| 4,999 | 11/1912 | United Kingdom | 47/44 |

Primary Examiner—Edgar S. Burr
Assistant Examiner—Steven A. Bratlie
Attorney, Agent, or Firm—Mahoney & Stebens

[57] ABSTRACT

A collapsible plant support is provided having a plurality of elongated wire-rod legs which are rigidly secured together at one end. Several helically-wound wire springs of normally elongated configuration are also provided with each spring having the opposite ends adapted to be interconnected and thus form circular rings. These rings are positioned at vertically spaced elevations on the legs which are relatively divergent from their connected ends when the plant support is positioned upright on the ground. Each of the elongated legs is formed with longitudinally spaced notches into which the circularly configured wire springs are positioned and supported on the divergent legs having their free end portions inserted into the ground. Collapsing of the plant support for storage is readily accomplished by first pulling the legs from the ground thereby releasing the rings. The rings are then disconnected at their ends whereupon they again assume the relaxed, elongated configuration. The helical wire springs have an internal diameter to permit the springs to be threaded onto respective ones of the elongated legs in retained relationship for purposes of storage.

7 Claims, 5 Drawing Figures

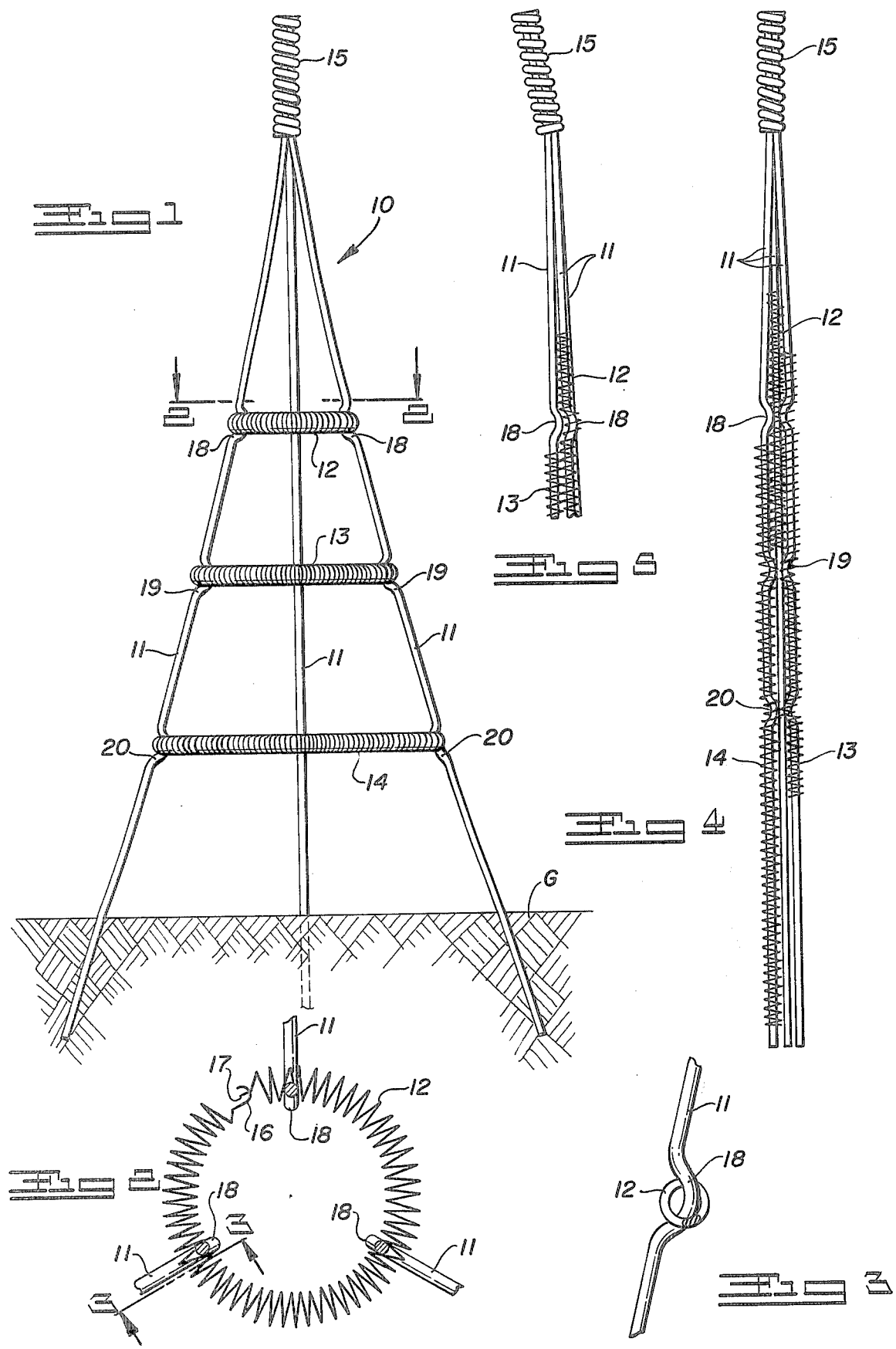

COLLAPSIBLE PLANT SUPPORT

BACKGROUND OF THE INVENTION

Various types of plant supports have heretofor been devised and fabricated. One such well known plant support is designed primarily for utilization with tomato plants and comprises a simple wooden stake that is merely driven into the ground and the plane is then tied to the stake as it grows. A plant support of this type is simple however it is inconvenient to periodically tie the plant to the stake at different stages in its growth. Also, considerable difficulty is encountered in driving the wood stakes into the ground and substantial strength and energy is required. A disadvantage of the wood stakes is that they do deteriorate during the course of a growing season and usually cannot be utilized for more than one season.

Another form of plant support that has been previously developed comprises a wire-frame grid in which the plant grows. An example of a plant support of that type, is shown in U.S. Pat. No. 915,146, issued to Woerner in 1909. The plant support illustrated in that patent comprises a pair of U-shaped wire rods having a plurality of loops integrally formed along the length of each of the legs thereof at predetermined spaced intervals. These loops are formed to cooperatively interengage with circular wire rod rings of substantially rigid construction. A plant support of this construction is capable of continued utilization over a number of years which is an advantage over the relatively short life-span of a wood stake.

The Woerner plant support may be disassembled for purposes of storage from one season to the next. To accomplish this the several circular rings are removed from the respective loops and secured with the two then separate U-shaped leg structures. A disadvantage of this structural arrangement is that the several parts or components remain relatively separate and, unless securely tied together, become readily separated with likelihood of the parts becoming lost during storage. A further and substantial disadvantage is that the circular, wire-rod rings are not capable of providing adequate and proper support for the portions of the plants that extend horizontally over and are supported on the rings.

SUMMARY OF THE INVENTION

A plant support is provided in accordance with this invention which is readily collapsible for purposes of storage and when assembled provides a substantial support for the portions of the plants that extend horizontally over the horizontally disposed supporting elements. The plant support of this invention comprises a vertically supporting structure formed from three elongated, wire-rod legs that are mechanically secured together at one end. These wire rods are formed from a material having a degree of resilience and normally lie in parallel relationship to each other. However, as a consequence of the resilient characteristics of the material, the three legs may be separated in mutually divergent relationship from the end at which they are interconnected to an expanded configuration in the form of a tripod. Horizontal support elements in the form of helically-wound wire springs formed into circular rings are positioned on the leg structure at selected elevations to provide vertical support for a plant. A series of notches are preferably formed in each of the legs at the selected elevations for cooperative engagement with the horizontal elements and assure maintenance of these elements at the desired elevations.

Storage of the plant support of this invention is greatly enhanced through the utilization of the helicallywound wire springs for the horizontal support elements. These helical springs are fabricated to be disconnected from the circular ring configuration whereupon they assume a normal, elongated and longitudinally extending configuration. When in the elongated, longitudinal configuration, the helical springs which are formed with a predetermined internal diameter may then be readily threaded onto respective ones of the elongated legs. These horizontal support elements are thus securely retained in assembled relationship with the legs for purposes of storage resulting in a compact and secure arrangement.

In addition to the advantageous structural features readily permitting collapsing of the plant support to a compact configuration for purposes of storage, the helical springs forming the horizontal support provide a very substantial surface for supporting the plant material. These springs have an inherent effective surface area which is substantially larger than that which could be economically attained through use of a single wire rod arrangement as disclosed in the known prior art. An effectively broad surface such as that provided by the helical springs results in substantially less damage to the plant material. Additionally, the plant materials are effectively retained in a fixed position on the helical springs in view of the fact that portions thereof will readily enter and engage the helixes of the spring. Furthermore, the resiliency of the helical springs provides a cushioning effect which results in a much more satisfactory support for a plant branch than does a rigid metal ring of the prior art.

These and other objects and advantages of this invention will be readily apparent in the following detailed description of an embodiment thereof and the accompanying drawings clearly illustrating this embodiment.

DESCRIPTION OF THE DRAWING FIGURES

FIG. 1 is an elevational view of a plant support embodying this invention and disposed in an operative, assembled configuration.

FIG. 2 is a horizontal sectional view taken along line 2—2 of FIG. 1.

FIG. 3 is a fragmentary vertical sectional view taken along line 3—3 of FIG. 2.

FIG. 4 is a elevational view of the plant support assembled into a storage or collapsed configuration with the springs threaded onto the legs.

FIG. 5 is a fragmentary elevational view of the plant support as viewed from the right side of FIG. 4.

DESCRIPTION OF THE ILLUSTRATED EMBODIMENT

Having reference to the drawings, specifically FIG. 1, a plant support 10 embodying this invention is shown positioned in an upright operative configuration for the support of a plant. Forming the plant support is a leg structure including three elongated legs 11 and three circular support elements 12, 13 and 14. Each of the elongated legs 11 is fabricated from a wire rod capable of providing the necessary structural support but having a predetermined degree of resiliency. All of the legs are mechanically secured together at one end by suitable fastening means 15. This fastening means 15 in the illustrated embodiment preferably comprises a helical clamping spring which is wound onto the parallel and adjacently disposed end portions of the legs 11 in clamping relationship. This clamping spring 15 secures the three leg elements to each other and prevents longitudinal displacement thereof.

FIG. 1 illustrates the plant support 10 when assembled and erected in an operative configuration whereas FIGS. 4 and 5 illustrate the support disposed in the collapsed configuration for storage. As can be best seen in FIG. 5, the legs 11 are each preferably preformed with a small angle bend at the approximate lower end of the helical clamping spring 15. This bend is of the order of a 10° angle between the end portion of the legs 11 engaged by the clamping spring and an extension of the longitudinal axis of the main portion of the legs. Although the clamping spring 15 is effective in mechanically securing the legs 11 together, the clamping force that is exerted is not so great that the legs may not be relatively rotated about their respective axes within the clamping spring. This permits the legs to be relatively rotated between the position shown in FIG. I and the position shown in FIGS. 4 and 5.

Forming the horizontal support elements 12, 13 and 14 are respective elongated sections of helically-wound wire springs. Each of the three support elements is of a different length with the length of each being determined by the respective vertical position which that spring will occupy when assembled with the leg structure. These helically wound wire springs are also provided at each end with respective hook elements 16 and 17. These hook elements are configured to cooperatively inter-engage when the horizontal support element is turned from the normal elongated configuration into a circular configuration as shown in FIG. 2.

With the leg structure positioned in an upright position and shown in FIG. 1 and the free end portions of the elongated legs 11 inserted into the ground G, it will be seen that the leg structure assumes a substantially tripod-shaped configuration. The portions of the elongated legs 11 extending between the ground surface and the clamping spring 15 will assume a slightly bowed configuration as shown in FIG. 1, with this bowing being minimized as a result of the prebend formed in the legs at the lower end of the clamping spring. When thus vertically erected, the horizontal support elements 12, 13 and 14 may then be positioned on the leg structure as illustrated. Prior to being so positioned, the three hortizontal support elements will have been assembled into the circular configuration shown in FIG. 2 with the hook elements 16 and 17 interengaged. Since the horizontal support elements 12, 13 and 14 are formed from different lengths of helical springs it will be readily apparent that each will be positioned at a relatively different and selected vertical elevation on the leg strcture. In erecting the plant support, the legs are preferably positioned so that when the free end portions are inserted in the ground to the proper depth, the helical wire springs must be slightly expanded to be positioned on the legs at the desired elevation. It will be noted that the prebend in the legs 11 and which minimizes the inward bowing of the legs results in a more stable structure and a stronger structure. The legs are less likely to bow further inward under the weight of a plant supported thereon and thereby prevent loosening of the horizontal support elements or, alternatively, their downward movement.

To assure that the horizontal support elements 12, 13 and 14 are maintained at the desired and predetermined elevation, each of the elongated legs 11 is formed with a series of notches 18, 19 and 20 with these notches being formed at longitudinally spaced positions along the respective legs. These notches are preferably formed as integral portions of the respective legs and comprise portions of the wire rod that are arcuately deformed into a semicircular configuration. Also, these notches 18, 19 and 20 are deformed to project laterally of the rod and extend relatively inward of the three assembled legs 11 configured as shown in FIG. 1 with the notches opening outwardly. In effect, these notches are disposed in planes lying parallel to the longitudinal axis of the legs and mutually intersecting centrally of the legs.

Each of the horizontal support elements 12, 13 and 14 may thus be disposed in their respective set of notches 18, 19 and 20. As can be best seen in FIGS. 2 and 3, the diameter of the wire rod forming the legs 11 is of a dimension which permits the legs to interfit between the adjacent helices of the wire springs forming the horizontal support elements. This assures that the horizontal support element will be retained in the desired horizontal position at the preferred vertical elevation.

When the leg structure is withdrawn from the ground, the three elongated legs 11 will return to a substantially parallel relationship as shown in FIG. 4. When thus configured, the three horizontal support elements 12, 13 and 14 will simply drop from the leg structure where they may be readily retrieved. The three horizontal support elements may then be disconnected at their respective hook elements 16 and 17 which will permit these elements to return to a linear configuration. When in this elongated configuration, the helical springs which are of a predetermined internal diameter are then threaded axially onto respective ones of the elongated legs 11 as shown in FIG. 4. Thus, the horizontal support elements 12, 13 and 14 will be securely retained on the leg structure for purposes of storage. Concurrently, the legs 11 are relatively rotated about their longitudinal axis within the clamping spring 15 to effectively orient the legs in the same position. This prevents the prebend in the legs from maintaining the legs in a relatively divergent relationship and thereby minimizing the storage configuration of the plant support. This storage configuration is relatively compact and the plant support may be conveniently suspended from a hook or other support means or merely placed into a suitably storage compartment.

It will be readily apparent from the foregoing detailed description of an embodiment thereof, that a particularly novel and effectively useful plant support is provided having substantial advantage over the prior art. The plant support of this invention is of a construction which provides effective and particularly advantageous support for a plant as a consequence of having helical wire springs for the horizontal support elements. The wire-rod leg structure forms a rigid and sturdy vertical standard for carrying the helical-spring, horizontal support elements with the wire-rod legs and helical springs cooperatively configured to be readily assembled into an operative or storage configuration.

Having thus described the invention, what is claimed is:

1. A collapsible plant support comprising at least three elongated legs fabricated from flexible wire rod with all of said legs being interconnected at one end, said legs being displaceable between a collapsed configuration wherein said legs are disposed in substantially parallel relationship and an expanded configuration wherein said legs are mutually divergent from their interconnected ends, and at least one helically-wound wire spring of predetermined length to extend around said legs and form a closed loop at a selected axial position along side legs when said legs are flexed to said mutually divergent configuration for support of plant elements by said spring, each end of said helical spring provided with means cooperatively interengageable to secure said spring in said closed loop configuration around said legs and supported thereon when said legs are vertically disposed and flexed to said expanded configuration, each of said legs having support means formed therewith and projecting laterally outward thereof at said selected axial position and cooperatively interengageable with said helical spring for vertical support thereof when the legs are in said expanded configuration and said helical spring is formed with an internal diameter to thread axially onto one of said legs and cooperatively interfit with said support means in retained relationship on said leg.

2. A collapsible plant support according to claim 1 having an equal number of a plurality of said means for vertical support of springs formed in each of said legs in spaced relationship at selected axial positions, and a plurality of said helical springs equal in number to the number of said means for vertical support formed in one of said legs, each of said helical springs being of a length proportional to the circumferential length around the expanded legs at a respective one of said selected axial positions and of an internal diameter to thread axially onto a leg and cooperatively interfit with said means for vertical support in retained relationship on a leg.

3. A collapsible plant support comprising at least three elongated legs fabricated from flexible wire rod with all of said legs being interconnected at one end, said legs being displaceable between a collapsed configuration wherein said legs are disposed in substantially parallel relationship and an expanded configuration wherein said legs are mutually divergent from their interconnected ends, and at least one helically-wound wire spring of predetermined length to extend around said legs and form a closed loop at a selected axial position along said legs when said legs are flexed to said mutually divergent configuration for support of plant elements by said spring, each end of said helical spring provided with means cooperatively interengageable to secure said spring in said closed loop configuration around said legs and supported thereon when said legs are vertically disposed and flexed to said expanded configuration, each of said legs having a notch formed therein at said selected axial position and cooperatively interengageable with said helical spring for vertical support thereof when the legs are in said expanded configuration, said notches being deformed portions of a respective wire-rod leg projecting laterally of the leg and oriented to open outwardly with respect to the plant support when the legs are in said expanded configuration, and said helical spring is formed with an internal diameter to thread axially onto one of said legs and cooperatively interfit with said notch in retained relationship on said leg.

4. A plant support according to claim 3 having an equal number of a plurality of said notches formed in each of said legs in spaced relationship at selected axial positions, and a plurality of said helical springs equal in number to the number of notches formed in one of said legs, each of said helical springs being of a length proportional to the circumferential length around the expanded legs at a respective one of said selected axial positions and of an internal diameter to thread axially onto a leg and cooperatively interfit with a notch in retained relationship.

5. A plant support according to claim 3 wherein said helical spring is of a length requiring extension thereof to form a circle having a diameter commensurate with the divergent relationship of said legs at said selected axial position, said wire-rod legs interposed between respective coils of said spring.

6. A plant support according to claim 3 wherein said legs are secured at said one end by a helical clamping spring of predetermined length having said legs extending axially therethrough, said helical clamping spring wound on said legs in compressive clamping relationship.

7. A plant support according to claim 6 wherein said legs are prebent to a predetermined angular extent at the point where they enter said clamping spring and are relatively rotatable about their longitudinal axes within said clamping spring.

* * * * *